United States Patent

Sharp, Jr.

[11] 3,798,011
[45] Mar. 19, 1974

[54] MULTILAYERED METAL COMPOSITE

[75] Inventor: William F. Sharp, Jr., Bellmawr, N.J.

[73] Assignee: E. I. du Pont de Nemours and Company, Wilmington, Del.

[22] Filed: Jan. 26, 1970

[21] Appl. No.: 5,990

Related U.S. Application Data

[63] Continuation-in-part of Ser. No. 795,505, Jan. 31, 1969, abandoned.

[52] U.S. Cl.............................. 29/197, 29/196.2
[51] Int. Cl............................................ B32b 15/00
[58] Field of Search ............. 75/126; 29/197, 197.5, 29/196.2, 198, 196

[56] References Cited
UNITED STATES PATENTS

| | | | |
|---|---|---|---|
| 1,934,673 | 11/1933 | Klemperer | 29/197.5 |
| 2,916,815 | 12/1959 | Donkervoort | 29/197 |
| 3,473,216 | 10/1969 | Webb | 29/197 |
| 3,397,045 | 8/1968 | Winter | 29/191 |
| 3,278,298 | 10/1966 | Perry | 75/128 R |
| 3,055,088 | 9/1962 | Cox | 29/198 |
| 3,105,293 | 10/1963 | Skinner | 29/197 |
| 3,173,202 | 3/1965 | Farber | 29/196.2 |
| 3,194,643 | 7/1965 | Ma | 29/196 |
| 3,205,090 | 9/1965 | Caplow | 29/197 |
| 3,233,312 | 2/1966 | Cowan | 29/198 |
| 3,290,129 | 12/1966 | Nock | 29/196.2 |
| 3,473,216 | 10/1969 | Webb | 29/198 |

OTHER PUBLICATIONS

Wrought Stainless Steels, page 409, Metals Handbook, 8th Edition, published American Society of Metals.

Primary Examiner—Hyland Bizot

[57] ABSTRACT

Interlayers of malleable tantalum-, columbium-, aluminum-, or titanium-base metals are employed between layers of high-yield-strength aluminum-, titanium-, or zirconium-base metals and dissimilar layers of high-yield-strength-iron-, nickel-, or aluminum-base metals to provide metallurgically bonded metal composites having good shear strength and superior resistance to impact loading. The composites are useful, e.g., as transition joints, and are used to best advantage where gas-tight tubular transition joints are required. Transition joints composed of high-yield-strength titanium- or aluminum-base metals bonded to high-yield-strength stainless steel via an interlayer of tantalum- or columbium-base metal exhibit outstanding low-temperature properties, and composites of high-yield-strength zirconium-base metals bonded to such stainless steels via the same interlayers make superior transition joints for nuclear applications.

4 Claims, 4 Drawing Figures

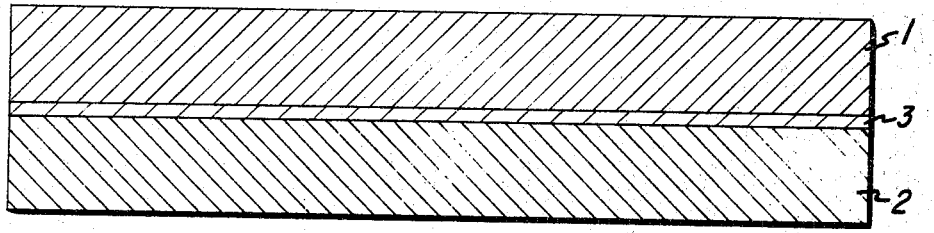

PATENTED MAR 19 1974 3,798,011

INVENTOR.
William F. Sharp Jr
BY

MULTILAYERED METAL COMPOSITE

CROSS-REFERENCE TO RELATED APPLICATION

This application is a continuation-in-part of my co-pending, coassigned application Ser. No. 795,505, filed Jan. 31, 1969 now abandoned.

BACKGROUND OF THE INVENTION

This invention relates to multilayered metal composites that are useful, e.g., as transition joints, and to the preparation of such composites.

High-yield-strength aluminum-, titanium-, and zirconium-base metals are currently receiving much attention in the cryogenics, construction, nuclear engineering, oceanology and aerospace fields for use in combination with high-yield-strength nickel-base metals and high-yield-strength maraging or face-centered cubic iron base metals, and, in the case of the titanium- and zirconium-base metals, also in combination with high-yield-strength aluminum-base metals. When using such combinations, it often is desirable to provide joints of superior structural integrity between the metals. Consequently, there is use for strong and ductile metallurgically bonded metal composites or transition joints containing these dissimilar metal combinations. For many such applications, the metallurgical bond should be both strong and ductile and have superior resistance to impact loading. Where the composites are to be used, e.g., as transition joints in high-pressure or high-vacuum service, the bonds should also be substantially free of microcracks and solidification defects (voids) that are potential sites of leakage.

Thus far, however, efforts to provide such metallurgical bonds directly between the metals of the above combinations have been unsuccessful, primarily for two reasons. First, all of the named metal pairs form brittle intermediate phases, i.e., brittle alloys which may be mixtures and/or intermetallic compounds of the parent metals, and therefore cannot be bonded satisfactorily by forming an alloy at their interface, e.g., by diffusion or fusion (melt) bonding. Second, since the metals are of high yield strength they are difficult to deform plastically at the interface in the manner required to give good direct metal-to-metal bonding between them. For these reasons, even explosion-bonding, e.g., as described in U.S. Pat. No. 3,397,444, has failed to provide such metals with metallurgical bonds having the combination of strength, ductility and resistance to impact loading that is required for certain applications.

SUMMARY OF THE INVENTION

The present invention provides metal composites having an outer layer of high-yield-strength aluminum (Al)-, titanium (Ti)-, or zirconium (Zr)-base metal joined to a dissimilar outer layer of high-yield-strength nickel (Ni)- or Al-base metal or to a high-yield-strength iron (Fe)-base metal of the maraging or face-centered cubic type by strong and ductile metallurgical bonds that are resistant to impact loading. The invention is based on the discovery that such bonds can be provided between these combinations of high-yield-strength metals if they are bonded via malleable interlayers of certain metals. Interlayers that can be bonded to each of the above outer layer metals are malleable tantalum (Ta)-base metals and malleable columbium (Cb)-base metals. Also, interlayers of malleable Al- or Ti-base metals can be used provided they are not bonded directly to Fe- or Ni-base outer layers. Stated differently, when one of the outer layers is an Fe- or Ni-base metal, it is bonded directly to a Ta- or Cb-base interlayer. The strength, ductility and resistance to impact loading of the metallurgical bonds in the composites of this invention is evidenced by the fact that the composites have a shear strength greater than 75 percent of that of weaker metal layer before bonding and are able to maintain their bond integrity when the bonds are impacted with a chisel, i.e., the layers of the composite can be cut apart from each other by impacting each bond with a chisel but the bonds themselves do not fail or separate.

The outer layers are "dissimilar," meaning they are based on different metals; thus composites wherein the outer layers are the same or different aluminum-base metals are not included within the scope of this invention. By Al-, Ti-, Zr-, Fe-, Ni-, Ta-, or Cb-base metal is meant a metal wherein the designated metal is the major component. The Fe-base metal outer layers of this invention have a face-centered cubic structure or are maraging steels, and therefore are often referred to herein as face-centered cubic or maraging Fe-base metals.

The yield strengths referred to herein are those normally supplied by metals manufacturers and are measured in the conventional manner (ASTM-E8-61T).

An important feature of the outer layers is their "high yield strength" which as used herein means Al-base metals having a yield strength greater than about 18,000 psi before bonding, i.e., when the metal is ready for bonding; Ti-base metals and Zr-base metals having a yield strength greater than about 90,000 psi before bonding; face-centered cubic and maraging Fe-base metals having a yield strength greater than about 50,000 psi before bonding; and Ni-base metals having a yield strength greater than about 50,000 psi before bonding; or outer layer metals of the designated composition whose strain hardening characteristics are such that after the metal is cold worked 50 percent from the fully annealed condition, its yield strength will exceed the above-specified yield strengths. Fifty percent cold working is exemplified by cold rolling the metal from a thickness of one-fourth inch to a thickness of one-eighth inch, stretching the metal until its thickness is thus reduced 50 percent, etc.

If either of the foregoing tests applies to the metal in question, it is a high-yield-strength metal for purposes of this invention. For example, assume it is to be determined whether a layer of partially hardened aluminum having a yield strength of 15,500 psi is high-yield-strength aluminum. Since its yield strength is not greater than about 18,000 psi, it does not meet the first test. Consequently, its strain hardening characteristics would have to be determined. To do this, a ¼-inch-thick sample of the partially hardened aluminum would be fully annealed and then cold rolled to one-half of its original thickness. After this, the yield strength of the cold-worked aluminum would be measured as is, i.e., without annealing. If, for example, the measured yield strength were 16,500 psi, the aluminum would not meet the second of the above tests; but if the measured yield strength were 20,000 psi, the aluminum would meet the second test and therefore be considered high-yield-strength aluminum for purposes of this invention. Preferably, before bonding, each outer layer will have a yield strength not in excess of about 180,000 psi and a tensile elongation of at least about 10 percent in a 2-inch gauge length before breakage (hereinafter referred to as tensile elongation), the reason being that it is difficult to obtain the desired type and degree of bonding when layers having higher yield strengths or lower tensile elongations are employed.

It also is important that the Ta-, Cb-, Al-, and Ti-base metal interlayers be "malleable" which, as used herein, means Cb-base metals and Ta-base metals having a yield strength and tensile elongation of up to about 50,000 psi and at least about 10 percent, respectively, before bonding, i.e., when ready for bonding; Al-base metals having a yield strength of up to about 17,000 psi before bonding or whose strain hardening characteristics are such that after the metal is cold worked 50 percent from the fully annealed condition, its yield strength does not exceed about 17,000 psi; and Ti-base metals whose yield strength before bonding is up to about 85,000 psi or whose strain hardening characteristics are such that after the metal is cold worked 50 percent from the fully annealed condition, its yield strength does not exceed about 85,000 psi. Sometimes hereinafter the interlayers will be referred to as malleable Ta, Cb, Al, or Ti, or be designated solely by the metal on which they are based.

BRIEF DESCRIPTION OF THE DRAWING

In the accompanying drawing which illustrates specific embodiments of this invention: FIG. 1 is a cross-sectional view of a planar composite of this invention; FIG. 2 is a longitudinal cross-sectional view of a tubular composite of this invention; FIG. 3 is a cross-sectional view of a tubular transition joint of this invention that has been machined from a planar composite such as shown in FIG. 1; and FIG. 4 is a cross-sectional view of a tubular transition joint that has been machined from the tubular composite of FIG. 2. In the drawing, like numerals designate similar parts.

DETAILED DESCRIPTION OF THE INVENTION

Referring to FIGS. 1 and 2 of the drawing, the metal composites of this invention comprise outer layer 1 of high-yield-strength Al-, Ti-, or Zr-base metal; dissimilar outer layer 2 of high-yield-strength Fe-, Ni-, or Al-base metal; and interlayer 3 sandwiched between and metallurgically bonded to outer layers 1 and 2. Interlayer 3 is of malleable Ta, Cb, Al, or Ti, subject to the aforementioned limitation on the use of Al and Ti. Layers 1 to 3 constitute a composite having a shear strength greater than 75 percent of that of the weaker metal layer before bonding and which is capable of maintaining its bond integrity at each interface (bond) when the bond is impacted by a chisel.

The high-yield-strength layers are referred to as "outer layer(s)" because they are bonded directly to the interlayer and therefore are outside with respect to the interlayer. Normally, the composites will consist of only three layers; however, if required, two or more layers of the same or different interlayer metals may be used between the outer layers, subject to the aforementioned limitation on the use of aluminum and titanium interlayers. Also, composites may be provided in which one outer layer is common to two pairs of outer layers so as to form a five-layer composite of the sequence: outer layer/interlayer/outer layer/interlayer/outer layer. In this case the common outer layer is a core layer.

The pairs of dissimilar metal outer layers are: Al-base metal with Ni-base metal or face-centered cubic or maraging Fe-base metal; Ti-base metal with such Fe-base metal or Ni- or Al-base metal; and Zr-base metal with such Fe-, Ni-, or Al-base metal. Except as already noted, the composition of the outer layers is not important, since it is the combination of their base-metal composition and initial yield strength or strain hardening characteristics that makes it impossible to bond them directly together by means of a strong and ductile metallurgical bond which is resistant to impact loading. Usually, though not necessarily, the outer layer will contain at least about 70 percent of the specified base metal, by weight. Regardless of the specific composition of the outer layers, the composites of this invention will be more ductile and resistant to impact loading than composites obtained by bonding the two outer layers directly together by any currently commercial process.

The following table shows the groups of metals from which the two outer layers (1 and 2 of FIGS. 1 and 2) can be taken, as well as some specific commonly used metals within each group. When outer layer 1 is selected from the A metals, outer layer 2 is any D or E metal. When outer layer 1 is selected from the B and C metals, outer layer 2 is any D, E or F metal.

TABLE I

| Outer Layer 1 | Outer Layer 2 |
| --- | --- |
| A. Aluminum-base metals, e.g., 2014, 2024, 2219, 3003, 5005, 5052, 5154, 5456, 5083, 5086, 6061, 7039, and 7178 (Aluminum Association designations) | D. Iron-base metals, e.g., face-centered cubic stainless steels such as AISI 304, 306, 321, 410, and 431; and maraging steels such as AISI 250 and 300 |
| B. Titanium-base metals, e.g., ASTM-B265-58T-Grades 2 to 4 (annealed), Grade 5 (Ti-6Al-4V), Grade 6 (Ti-5Al-2.5Sn), and Grade 7 (Ti-8Mn) | E. Nickel-base metals, e.g., Nickel 200 (ASTM-B160-162); "Inconel"[1] 600 and 718; and "Hastelloy"[2] B and C |
| C. Zirconium-base metals, e.g., ASTM-B351-353-67-Reactor Grades RA-1 and RA-2 (Zircaloy-2); and Zircaloy-4 | F. Aluminum-base metals — same as A metals for Layer 1 |

[1] Trade name of the International Nickel Co., Inc.
[2] Trade name of the Union Carbide Corp.

The interlayer is composed of one or more layers of malleable Ta, Cb, Al, or Ti. As previously indicated, when Ti or Al is an interlayer, it should not be bonded directly to a high-yield-strength Fe- or Ni-base metal. Thus, when Al or Ti is the sole interlayer, it is bonded between high-yield-strength Al and high-yield-strength Ti or Zr outer layers; and when one of the outer layers is a high-yield-strength Fe- or Ni-base metal, it must be bonded to a Ta or Cb interlayer. This interlayer can, in turn, be bonded to high-yield-strength Al-, Ti-, or Zr-base metal or to a different interlayer metal.

Each layer of the interlayer is commercially pure Ta, Cb, Al, or Ti or an alloy base on one of these metals, provided in each instance that it is malleable, as previously defined. Although the interlayer may be composed of more than one layer, one layer normally is most practical, hence preferred. Each layer of the interlayer preferably will be of normal commercial purity (e.g., at least about 99 percent base metal by weight) or will be an alloy containing at least about 85 percent base metal by weight, with layers of normal commercial purity being particularly preferred. Regardless of the specific composition of the interlayer the composites of this invention have materially better bond properties than two-layered composites wherein the outer layers of this invention are bonded directly to each other.

Suitable commmonly available interlayer metals include, inter alia, CP (commercially pure) Ta, CP Cb, Cb-1Zr, ASTM B26558T-Grade 1 Ti, and 1100, 1060, 1199, and EC (electrical conductor grade) Al.

All metallurgical bonds in the composites of this invention are strong, ductile, and resistant to impact loading, as evidenced by two tests, both performed at room temperature. First, the shear strength of the composite will be greater than about 75 percent of that of the weaker metal layer before bonding. This shear strength is determined by measuring the shear strength of the composite in the as-bonded condition by ASTM-A264. Composites wherein each metallurgical bond has a shear strength in excess of that of the weaker metal layer after bonding, i.e., failure in shear is in one of the metal layers and not at one of the bonds, are preferred.

Second, the composites are highly resistant to impact loading as evidenced by the fact that none of their bonds can be caused to fail by impacting it with a chisel. This test has been found to be a most reliable measure of bond integrity. It determines the resistance of the bond to fracture upon impact loading, and therefore requires that the bond be both ductile and of high tensile strength. The chisel test is performed, e.g., simply by cutting a sample from the composite and sequentially driving a standard cold chisel into each bond with sufficient force to cause the chisel to penetrate the metal, with the longitudinal axis of the chisel, hence the force vector, lying in the plane of the bond being tested. The cutting edge of the chisel should be longer than the sample is wide so that the whole width of the sample's bond is being tested. The configuration of the chisel and the means used to drive it into the sample are immaterial. Typically, the chisel will be driven into the bond by repeatedly impacting the chisel with a hand-propelled hammer. A chisel which can be employed as a standard has a V-shaped cutting edge that defines an included angle of 65°. For the composite to pass this test, the chisel must penetrate the bond being tested by cutting metal, as opposed to causing the bond to fail thus permitting the layers to separate. Bond failure is clearly evidenced by the layers popping completely apart or by separation of the layers ahead of the cutting edge of the chisel, with propagation of the separation as the chisel is driven into the bond.

The morphology of the metallurgical bonds between the interlayer and outer layers will vary depending on the composition and relative yield strengths of these layers as well as on the particular method by which the bonds are prepared. Generally, however, the bond formed between the interlayer and each outer layer will be outer layer metal-to-alloy-to-interlayer metal bond, direct outer layer metal-to-interlayer metal bond, or a mixture of these with the alloy bond being distributed between areas of such direct bonding. Direct bonding and direct metal-to-metal bonding mean that the parent metals are metallurgically bonded together at a common interface without the intervention of a layer of alloy. The preferred bonds, which are prepared by explosion-bonding, are substantially straight and continuous layers of ductile solidified melt or wavy bonds characterized by a regular wave pattern and comprising at least about 70 percent direct metal-to-metal bond, with solidified melt bond substantially uniformly distributed in periodic regions spaced between areas of such direct bonding. The straight solidified melt bonds normally have a thickness less than about 80 microns and preferably less than about 40 microns. Wavy bonds preferably are at least 90 percent direct bond, particularly if the solidified melt contains brittle intermediate phases. The percentage of direct metal-to-metal bonding is obtained by measuring the total length of the continuous wavy interface and the lengths of the small sections of parent metal-to-solidified melt interface. The difference between the total length of the wavy interface and the sum of these section lengths, divided by the total length of the interface gives the percent of direct bonding. Regardless of the type of bond zone present, the composites preferably are metallurgically bonded over at least about 90 percent of each interface.

Where the metals of the interlayer and outer layer together form a ductile alloy, the bond between them may be prepared, for example, by roll bonding, inertia (i.e., friction) welding, flash-butt welding, or by explosion bonding. Unlike the other bonding processes, explosion bonding provides either a wavy type bond characterized by a regular wave pattern or a continuous solidified melt bond wherein the melt is a substantially uniform mixture of the parent metals. Certain outer layer-interlayer combinations form ductile alloy bonds because the metals have a high degree of mutual solubility. Such systems are Al/Al; Ti/Ti; Ti/Ta and Cb; and Zr/Ta, Cb, and Ti. Other metal combinations form alloys of adequate strength and resistance to impact loading because the difference between their melting points prevents the formation of a substantial amount of brittle intermediate phases, albeit they normally would form these phases in amounts sufficient to render their bonds totally unacceptable. Such outer layer-interlayer combinations are Al/Ta and Al/Cb.

The interlayer-outerlayer combinations not mentioned in the preceding paragraph (i.e., Al/Ti; Zr/Al; and Ta and Cb/Fe and Ni) form significant amounts of brittle intermediate phases. Consequently, the bonds between them must be extremely thin, e.g., less than about one micron, or be a wavy bond having at least 70 percent direct bonding, the latter being preferred. Both of these bonds are prepared by explosion bonding.

As already indicated, explosion-bonded composites are preferred. In these, the interface between a tantalum or columbium interlayer and an iron- or nickel-base metal preferably will be wavy. The bond between an outer layer of aluminum-, titanium-, or zirconium-base metal and an interlayer of tantalum or columbium normally will be a continuous layer of ductile solidified melt. Aluminum interlayers form a wavy bond with outer layers of Al-base metal, and the solidified melt is ductile. Aluminum interlayers also form wavy bonds with titanium- and zirconium-base metals, but with brittle intermediate phases in the melt regions. The latter is also true, of course, where a titanium interlayer is bonded to an outer layer of Al-base metal. Finally, a titanium interlayer forms wavy bonds with titanium- and zirconium-base metals, and the bonds are free of brittle intermediate phases. All explosion-bonds are practically diffusionless, e.g., diffusion normally cannot be detected across any interface when it is examined with an electron probe and by sectioning techniques having a 0.2 micron limit of resolution.

All interlayer-outer layer combinations of this invention have bonds of superior strength and resistance to impact loading. The bonds are practically free of solidification defects and microcracks, as illustrated by the fact that tubular composites of this invention wherein the interlayer is in a plane perpendicular to the axis of the tube (see FIG. 3) and which have a 100-mil-thick wall at the bonds, will not leak helium at a rate greater than $1 \times 10^{-8}$ atm cc/sec. Furthermore, since any brittle intermediate phases in the bond are isolated by direct bonding, the bonds are capable of withstanding severe impact, vibration, and thermal cycling without developing microcracks or other defects. Nevertheless, certain interlayers and outer layers are preferred in particular situations.

Malleable Ta and Cb form bonds of superior strength, resistance to impact loading, and freedom from microcracks and solidification defects when bonded to outer layers of this invention, making these interlayers preferred when optimum strength, ductility, and resistance to gas leakage are desired. Ta and Cb also have good low-temperature ductility, making them useful for low-temperature applications. Tantalum does not have a brittle-ductile transition temperature, and columbium does not undergo a brittle-ductile transition at temperatures down to about $-200°F$. When explosion-bonded to Ni-base metals and face-centered cubic or maraging Fe-base metals, Ta and Cb form wavy bonds with exceptionally small melt pockets and a high percentage of direct bonding; and with the Al-, Ti-, and Zr-base metals, these interlayers form thin and continuous solidified melt bonds having outstanding mechanical properties.

Regarding preferred pairs of outer layers, the high-yield-strength Al-, Ti, or Zr-base metals in combination with the Fe- or Ni-base metals are particularly useful for vacuum and high-pressure service in corrosive environments. High-yield-strength zirconium combined with high-yield-strength stainless steel is eminently well suited for use in nuclear reactors. Composites having outer layers of high-yield-strength Ti- or Al-base metal on one side and high-yield-strength austenitic or martensitic stainless steel on the other are outstanding for low-temperature applications when bonded via an interlayer having the requisite low-temperature ductility. When tantalum is the interlayer between these outer metals, the composites have excellent properties throughout the entire cryogenic temperature range, i.e., about $-150°$ to $-452°F$, and therefore make exceptional transition joints for cryogenic applications.

The explosion-bonded composites are prepared as described in aforementioned U.S. Pat. No. 3,397,444, the disclosures of which are incorporated herein by reference. The three (or more) layers to be bonded may be bonded in one step, e.g., by positioning the layers at the required initial standoff from one another and preferably substantially parallel to each other, and detonating a layer of explosive adjacent the outer surface of one of the outer layers so that the metal layers collide at the desired velocity. On the other hand, it may be desirable in certain cases to bond the metal pairs in separate steps, e.g., when it is advantageous to employ different collision velocities to bond the different metal pairs making up the composite. The decision regarding which pair to bond first and which layer to propel by means of the explosive depends chiefly on the relative masses of the metal layers involved. For example, in making a composite of aluminum-base alloy/tantalum/stainless steel or titanium-base alloy/tantalum/stainless steel wherein the tantalum mass is less than that of every other layer and the combined aluminum/tantalum or titanium/tantalum mass is less than that of the stainless steel, the aluminum/tantalum or titanium/tantalum bonded composite may be made by propelling the tantalum layer first, and then the bilayered composite may be propelled, tantalum side in, so as to collide with the stainless steel. Alternatively, the tantalum may be bonded first to the stainless steel (tantalum propelled) and the aluminum- or titanium-base alloy then bonded to the tantalum. Additionally, where the interlayer does not form brittle intermediate phases with one outer layer but does with another, the first interlayer-outer layer combination may be provided in the form of roll-bonded or diffusion-bonded duplex (two-layered) plate or sheet which is then explosion-bonded to the second outer layer, or vice versa, to form a multi-layered composite of this invention.

Collision velocities below about 2,500 meters per second are preferred to assure the required type of bonding. For bonding the interlayers to each other or to high-yield-strength Al-, Ti-, or Zr-base outer layers, especially preferred collision velocities are about 2,000–2,400 meters per second. Especially preferred collision velocities for bonding Ta and Cb interlayers to Fe- or Ni-base outer layers are about 1,500–1,800 meters per second.

Collision angles within the range of about from 10° to 14° generally are preferred for bonding the interlayer to iron- or nickel-base outer layers, while angles within the range of about from 8° to 12° are preferred for bonding the interlayer to the other outer layers.

When explosion-bonding, edge-extension pieces preferably are employed on all edges of the explosively driven layer (cladder) when such layer is greater than 3/16-inch thick. This ensures the maximum degree of bonding and proper bond morphology at the initiation end of the cladder, i.e., the end where the explosive is initiated. The edge-extension pieces will normally be of about the same density and thickness as the cladder. The extension piece at the initiation end will have a width about 6 to 8 times that of the cladder and normally is attached to the cladder by continuous butt-welding. Extension pieces at the other three edges will have a width of about 2 to 4 times that of the cladder and usually are attached to the cladder by tack welding. All extension pieces shear off during bonding. Where edge-extension pieces are employed, the layer of explosive should be of the same length and width as the cladder plus its extension pieces.

The relative thicknesses of the layers in the bonded composite can vary as ultimate use requires. However, since it usually is desirable for the composites to retain, as near as possible, the characteristics of the outer layers, the interlayer generally will not be used in a thickness greater than required to achieve the desired bonding. As a rule, the thickness of the interlayer will be about from 0.02 to 0.1 inch. At least one, and usually both, of the outer layers will be thicker than the interlayer. The thickness of the outer layers and the total thickness of the composite are not limiting features. Larger amounts of explosive are required to propel sive than can be handled is required to propel a layer of a required thickness, the outer layer can be applied in more than one bonding step so that in the resulting composite the outer layer is itself a bonded laminate.

The bonded composite can be provided in any desired shape. Ordinarily, the bonding process is performed on flat layers, e.g., plates or sheets, to provide a planar composite as shown in FIG. 1; or on cylindrical layers, e.g., tubes, to provide a tubular composite such as shown in FIG. 2. A variety of other configurations can be made by machining parts from the bonded composites of FIGS. 1 and 2, as illustrated in FIGS. 3 and 4, respectively.

FIG. 3 is a tubular transition joint of this invention, which has been machined from a planar composite like that of FIG. 1. The transition joint comprises tubular outer layers 1 and 2 of dissimilar metals, which are joined end-to-end through a ring-shaped interlayer 3. Normally, outer layers 1 and 2 and interlayer 3 will be of substantially the same internal diameter. The tubular transition joint preferably is provided with an integral annular rib or shoulder 5 that bridges the interlayer and the adjacent portions of tubes 1 and 2, thereby providing the transition joint with reinforcement in the area of the bond zones. In practice, the free end of tube 1 would be welded to a tube of the same metal, and the free end of tube 2 would be welded to a tube of the same composition, thus to complete a piping circuit.

FIG. 4 exemplifies a different embodiment of transition joint of this invention. This embodiment is prepared by machining portions of outer layer 1 and interlayer 3 from each end of the tubular composite of FIG. 2, thereby leaving a cylindrical collar 6 intermediate the exposed ends of tubular layer 2. Such a transition joint is useful, for example, in providing piping connections through the wall of a reaction vessel. For example, if a stainless steel feed line had to be connected to a titanium vessel, a transition joint would be prepared having a collar 6 of titanium and tubular layer 2 of stainless steel. A hole of slightly larger diameter than the collar would be cut in the vessel wall, and the transition joint positioned in this hole with the vessel wall intermediate the ends of the collar. The surrounding wall of the vessel would then be welded to the collar, with the result that tube 2 provides a passage through the vessel wall. The exterior end of tube 2 can then be welded to a feed pipe of the same composition, and the interior end of tube 2 can be similarly connected or left to discharge directly into the vessel, whichever is desired. Where only one end of tube 2 need be exposed to provide a surface for welding, collar 6 may extend all the way to one end of tube 2, i.e., outer layer 1 and interlayer 3 are machined from only one end of the tubular composite.

The following examples serve to illustrate specific embodiments of the products and process of this invention. However, they will be understood to be illustrative only and not as limiting the invention in any manner.

In all of the examples, the metal plates or sheets, which are 12 inches wide by 24 inches long, are positioned parallel to each other at a standoff, a layer of explosive is positioned on the outer surface of one of the plates or sheets, and the explosive is point-initiated at the center of one of its narrower edges. Where extension pieces are employed, as indicated in the examples, the extension piece at the initiation edge is continuously butt-welded to the cladder, and the other three pieces are attached by tack-welding. The explosive composition is a uniform mixture of grained 80/20 amatol (80 percent ammonium nitrate/20 percent trinitrotoluene) and 35–55 percent sodium chloride (table salt) based on the total weight of the composition, the percentage of sodium chloride being adjusted within this range to give the designated collision velocities. The collision velocity given in each case is the measured detonation velocity of the explosive. The explosive loading given includes the weight of sodium chloride.

The chisel employed to test bond integrity has a V-shaped cutting edge that defines an included angle of 65°. Shear strengths are obtained by ASTM-A264. In each of the examples, the composite is tested for deleterious solidification defects and microcracks by machining therefrom a tubular transition joint as shown in FIG. 3 wherein integral reinforcing rib 5 has a 100-mil wall thickness, and testing the joint for helium leakage. None of the joints leaks helium at a rate higher than $1 \times 10^{-8}$ atm cc/sec.

EXAMPLE 1 a. A 0.03-inch-thick sheet of tantalum of commercial purity (yield strength 35,000 psi) is bonded to a 0.75-inch-thick plate of 5083-0 aluminum alloy (yield strength 21,000 psi), the explosive being positioned on the outside surface of the tantalum sheet. The explosive loading is 6.5 lb/sq ft and the standoff is 0.09 inch. The collision velocity is 2,190 meters per second, and the impact angle 11°.

b. Extension pieces of 0.75-inch-thick extruded aluminum are attached to all four edges of the Al/Ta composite made according to Step (a). The extension piece at the initiation edge is about 6 inches wide and the remaining pieces are about 2 inches wide. The composite is then bonded to a 0.75-inch-thick 304L stainless steel plate (yield strength 35,000 psi, but substantially above 50,000 psi after 50 percent cold working) by positioning the explosive on the aluminum surface, with the tantalum surface facing the stainless steel. The explosive loading is 19 lb/sq. ft., and the standoff is 1 inch. The collision velocity is 1,640 meters per second, and the impact angle 14°.

The composite plate formed is bonded over about 95 percent of each interface. The tantalum/stainless steel bond is wavy and contains 87 percent direct Ta-to-stainless steel bond, the remainder being solidified melt in uniformly distributed regions. The aluminum/tantalum bond is a straight layer of ductile alloy less than 16 microns thick bonding the aluminum and tantalum. At room temperature as well as at −320°F., the composite cannot be separated at either bond zone by a chisel (i.e., it is resistant to impact loading even at cryogenic temperatures). The bond zone tensile strength in the as-bonded condition is above 56,500 psi. Failure in shear and tension occurs in the aluminum and not at the interfaces.

The low-temperature ductility of this composite makes it suitable for use at cryogenic temperatures, e.g., as a transition joint to enable the use of stainless steel tubes and fittings with aluminum Dewar shells for transporting and storing cryogenic fluids. For this application, the transition joint must also be leakproof to avoid loss of vacuum between the inner and outer shells of the Dewar.

A tube having a 0.5-inch outer diameter and 0.049-inch-thick wall is machined out of the three-layered composite plate with the tube axis in the thickness direction of the plate, and the tube is tested with respect to its helium leak rate. The joint is judged to be leak-proof inasmuch as it does not leak helium at a rate greater than $1 \times 10^{-10}$ atm cc/sec.

Individual tubular transition joints, e.g., as shown in FIG. 3, may be used in the Dewars with their stainless steel portion welded to stainless steel tubing and their aluminum portion to the aluminum shell. Alternatively, the transition joint may be in the form of a manifold through which all steel fittings are made. To do this, a ring may be machined from a composite plate and the aluminum portion welded to the aluminum shell, with a stainless steel cap, through which all of the steel tubes fit, welded to the stainless steel portion of the ring.

EXAMPLE 2

Example 1 is repeated with the exception that a 0.75-inch-thick plate of "Inconel" (Grade 718 having a yield-strength of 73,000 psi) is substituted for the stainless steel plate in Step (b). The Ta interlayer is bonded to the "Inconel" over more than 90 percent of their interface and, as before, the composite cannot be separated at either bond by a chisel and fails in the aluminum layer when tested in shear and tension. The morphology of the tantalum/"Inconel" bond is practically the same as that of the tantalum/stainless steel bond of Example 1.

EXAMPLE 3

Example 1 is repeated substituting a 0.03-inch-thick layer of columbium (ASTM B393-64, Type 2, having a yield strength of 30,000 psi) for tantalum and using an explosive loading of 4.7 lb/sq.ft. in Step (a). The resulting two-layered composite, with the columbium layer facing the stainless steel is bonded to the stainless steel as in Step (b). The result is a composite which is bonded over about 96 percent of each interface, cannot be separated at either interface by a chisel and which fails in the aluminum layer when tested in shear and tension. The bond between the aluminum and columbium is a continuous layer of ductile aluminum-rich solidified melt less than 40 microns thick; and the columbium/stainless steel bond is wavy, containing 92 percent direct columbium-to-stainless steel bond.

EXAMPLE 4

0.75-Inch-thick 5083-0/1060 Alclad aluminum (0.70-inch 5083-0 roll-bonded to 0.05-inch 1060) is substituted for the aluminum layer in Example 1, with the 1060 side of the Alclad being bonded to the tantalum interlayer. The composite from Step (b) is metallurgically bonded over more than 90 percent of each interface, cannot be separated at any bond by a chisel, and fails in the aluminum layer when tested in shear and tension. Bond morphology is the same as in Example 1.

EXAMPLE 5

A tantalum sheet identical to that employed in Example 1 is bonded simultaneously on one side to a 0.750-inch-thick plate of 6061-T6 aluminum alloy (yield strength 40,000 psi) and on the other side to a stainless steel plate the same as that described in Example 1. Aluminum extension pieces of the same size as the aluminum extension pieces of Example 1 are attached to the aluminum layer. The explosive is positioned on the outside surface of the aluminum, the explosive loading being 15 lb/sq ft. The standoff is 0.12 inch between the facing aluminum and tantalum surfaces, and 0.62 inch between the facing tantalum and stainless steel surfaces. The collision velocity is 2,310 meters per second; the impact angle is 9.5° between aluminum and tantalum and 7.6° between tantalum and stainless steel.

The composite plate is metallurgically bonded over more than 90 percent of each interface and cannot be separated at either bond zone by a chisel. The tensile strength of the composite in the as-bonded condition and with the bonds in tension is 49,900 psi. The aluminum/tantalum bond zone is in the form of a band of ductile aluminum-rich alloy 34 microns thick to which the aluminum and tantalum are bonded. Failure in shear is in the aluminum layer. The tantalum/stainless steel bond zone is wavy with isolated melt pockets and 85 percent direct bonding.

EXAMPLE 6 a. A 0.03-inch-thick sheet of the tantalum described in Example 1 is bonded to a 0.5-inch-thick Ti-6Al-4V plate (yield strength 120,000 psi) using a 0.09-inch standoff and an explosive loading (on the tantalum sheet) of 5.5 lb/sq ft. The collision velocity is 2,180 meters/second, and the impact angle 10°.

b. Extension pieces of 0.5-inch-thick CP Ti are attached to all four edges of the Ti/Ta composite made according to Step (a). The extension-piece at the initiation edge is about 3.5 inches wide and the remaining pieces are about 2 inches wide. The composite is then bonded to a 0.5-inch-thick plate of the 304L stainless steel described in Example 1, positioning the explosive on the titanium surface, with the tantalum surface facing the stainless steel. The explosive loading is 22 lb/sq ft and the standoff 0.62 inch. The collision velocity is 1,800 meters per second, and the impact angle 12°.

The resulting composite is bonded over about 90 percent of each interface, cannot be separated at either bond by a chisel, and fails in the Ta layer in shear and tension. The Ti/Ta bond is a continuous layer of ductile solidified melt 1 to 3 microns thick, and the Ta/stainless steel bond is wavy, with about 93 percent direct bond.

Tubular transition joints having a 0.5-inch outer diameter and 0.049-inch wall, machined from the composite plate formed, withstand internal pressurizing with helium at 12,000 psig without failure. They do not leak helium at a rate greater than $1 \times 10^{-10}$ cc/sec when subjected to 3,500 psig helium around the outside of the joint.

EXAMPLE 7

Example 6 is repeated with the exception that a 0.5-inch-thick plate of Zircaloy-2 (yield strength 35,000 psi, but above 90,000 psi after 50 percent cold working) is substituted for the Ti-6Al-4V plate in Step (a) and the resulting composite is bonded to the stainless steel as in Step (b), but using CP Zr extension pieces. The tantalum interlayer is bonded to the Zircaloy-2 over 95 percent of their interface and, as before, the composite cannot be separated at either bond by a chisel and fails in the tantalum layer when tested in shear and tension. The morphology of the tantalum/stainless steel bond is the same as in Example 6.

EXAMPLE 8

Example 7 is repeated substituting for the tantalum sheet in Step (a) a sheet of 0.03-inch-thick columbium (ASTM B393-64, Type 2, having a yield strength of 30,000 psi) and then bonding the resulting composite to 304L stainless steel as in Step (b). In the resulting composite (Zircaloy-2/Cb/stainless steel), the columbium interlayer is bonded to the outer layers over at least 92 percent of each interface. Bond strength and morphology are as in Example 7.

EXAMPLE 9

The procedure of Example 6 is repeated substituting a 0.5-inch-thick plate of AISI 250 maraging steel (102,000 psi) for the 304L stainless steel in Step (b). Degree of bonding and bond zone morphology are substantially the same as in Example 6. Failure of the composite in shear and tension is in the tantalum interlayer, and the composite cannot be separated at either bond by a chisel.

EXAMPLE 10

Example 6 is repeated, but with a 0.5-inch-thick layer of "Hastelloy" B (yield strength 56,000 psi) substituted for the stainless steel in Step (b). The resulting composite is bonded over more than 98 percent of each interface, cannot be separated at either bond by a chisel and fails in the tantalum layer when tested in shear and tension. The tantalum/"Hastelloy" bond is wavy and contains 88 percent direct bonding.

EXAMPLE 11

Example 10 is repeated substituting for the tantalum sheet in Step (a) a sheet of columbium identical to that employed in Example 8. The resulting composite (Ti/Cb/"Hastelloy") is bonded over more than 94 percent of each interface and cannot be separated at either bond by a chisel. The composite fails in the columbium layer when tested in shear and tension. Bond zone morphology is the same as in Example 10.

EXAMPLE 12

Following the procedure of Example 6, but substituting a 0.05-inch-thick layer of columbium for the tantalum interlayer and using an explosive loading of 4.5 lb/sq. ft. in Step (a), gives a composite plate which is metallurgically bonded over 94 percent of each interface, cannot be separated at either bond by a chisel and fails in the columbium interlayer when tested in shear and tension. The titanium/columbium bond is a continuous layer of ductile solidified melt less than 3 microns thick, and the columbium/stainless steel bond is wavy, having 92 percent direct bonding.

EXAMPLE 13 a. A 0.03-inch-thick sheet of 35A titanium (ASTM B265-58T-Grade 1, yield strength 35,000 psi) is bonded to a 0.75-inch-thick plate of 5456-H321 aluminum alloy (yield strength 37,000 psi), the explosive being positioned on the outside surface of the titanium sheet. The explosive loading is 6.5 lb/sq. ft. and the standoff is 0.06 inch. The collision velocity is 2,240, and the impact angle 12°.

b. 0.75-inch-thick extruded aluminum bars are attached to all four edges of the Al/Ti composite made according to Step (a). The extension bar at the initiation edge is about 5.5 inches wide and the remaining bars are about 3 inches wide. The composite is then bonded to a 0.75-inch-thick Ti-5Al-2.5Sn plate (yield strength 115,000 psi), positioning the explosive on the aluminum surface, with the titanium interlayer facing the 5Al-2.5Sn titanium. The explosive loading is 19 lb/sq. ft. and the standoff is 1 inch. The collision velocity is 2,400 meters per second, and the impact angle 14°.

The composite plate formed is bonded over about 98 percent of each interface. The Ti/Al interface is uniformly wavy and contains 90 percent direct Ti-to-aluminum bond, the remainder being solidified melt in uniformly distributed regions. The Ti/Ti bond is practically straight with occasional isolated melt regions. The composite cannot be separated at either bond zone by a chisel and has a tensile strength in the as-bonded condition and with the bonds in tension of 52,000 psi. Failure in shear and tension occurs in the aluminum layer.

EXAMPLE 14

Following the procedure of Example 13, but substituting a 0.03-inch-thick layer of 1,100-0 aluminum for the titanium interlayer, and using an explosive loading of 4.4 lb/sq. ft. in Step (a) gives a composite plate which is metallurgically bonded over more than 90 percent of each interface, cannot be separated at either bond by a chisel and fails in the aluminum interlayer when tested in shear and tension. The aluminum/aluminum bond is uniformly wavy, containing 91 percent direct bonding, and the aluminum/titanium bond is uniformly wavy, having about 83 percent direct bonding.

I claim:

1. A metal composite consisting of at least three layers comprising a first outer layer of a metal selected from the group consisting of high-yield-strength Al-base metals, Ti-base metals, and Zr-base metals; a second outer layer of a metal selected from the group consisting of high-yield-strength Ni-base metals, Al-base metals, and face-centered cubic and maraging Fe-base metals, said first and second outer layers being based on different metals; and at least one interlayer of a metal selected from the group consisting of malleable Ta- and Cb-base metals sandwiched between and metallurgically bonded to said first and second outer layers, the base metal of the interlayer and the base metal of at least one of the outer layers being metals which form a brittle intermediate phase and the bond between said layers being a continuous wavy bond characterized by a regular wave pattern and comprising at least 70 percent direct metal-to-metal bond, with solidified melt bond substantially uniformly distributed in periodic regions spaced between areas of such direct bonding; said composite having a shear strength greater than 75 percent of that of the weaker metal before bonding and being capable of maintaining its bond integrity at each interface when impacted with a chisel.

2. A metal composite comprising a first tubular layer of an Al-base metal, a second tubular layer of a face-centered cubic stainless steel, and a ring-shaped interlayer of a metal selected from the group consisting of malleable Ta- and Cb-base metals sandwiched between and metallurgically bonded to the ends of said tubular layers, the bond between said second tubular layer and said interlayer being a continuous wavy bond characterized by a regular wave pattern and comprising at least about 70 percent direct metal-to-metal bond, with solidified melt bond substantially uniformly distributed in periodic regions spaced between areas of such direct bonding, said composite having a shear strength greater than 75 percent of that of aluminum and being capable of maintaining its bond integrity at each interface when impacted with a chisel.

3. A three-layered composite of claim 1 wherein said second outer layer is a high-yield-strength Ni-base metal.

4. A three-layered composite of claim 1 wherein said second outer layer is a high-yield-strength Fe-base metal.

* * * * *